United States Patent Office 3,560,551
Patented Feb. 2, 1971

3,560,551
PROCESS FOR PREPARING SUBSTITUTED NITRILOMONOACETAMIDES
Melville E. D. Hillman, Summit, N.J., assignor to W. R. Grace & Co.
No Drawing. Continuation-in-part of application Ser. No. 719,250, Apr. 5, 1968. This application Oct. 10, 1968, Ser. No. 766,622
Int. Cl. C07c *121/02, 121/16, 121/20*
U.S. Cl. 260—465.4         10 Claims

ABSTRACT OF THE DISCLOSURE

This invention is directed to; (a) a nitriloamide having the formula

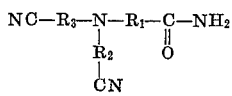

or

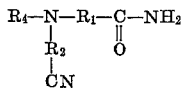

wherein, each of $R_1$, $R_2$, and $R_3$ is separately an alkylene radical having about 1–20 carbon atoms, and $R_4$ is an alkyl radical having about 1–20 carbon atoms; and (b) to a process for preparing said nitriloamides, said process comprising heating a nitrile having the formula

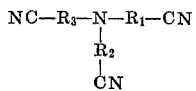

or

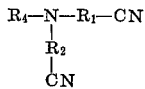

with hydrogen peroxide, all as described hereinafter. These products have two nitrile groups and can be polymerized with diamines to form polyamides useful as flocculating agents in water purification and sewage treatment; as intermediates for making polyamides with acid side groups, as antistatic compounds and as textile finishes.

CROSS REFERENCE TO RELATED APPLICATION

This is a continuation-in-part of my copending application Ser. No. 719,250, filed Apr. 5, 1968 and now abandoned.

BACKGROUND OF THE INVENTION

The present invention is in the field of nitrile monoacetamides—being directed to such amides and to a method for the synthesis thereof.

A prior art method of preparing amides is described in U.S. Pat. No. 2,921,960.

Heretofore it has been a common practice in the chemical art to prepare a group of compounds known as amine oxides, of the structure

where $R_a$, $R_b$ and $R_c$ can be aliphatic, aromatic, heterocyclic, or acyclic, by reacting tertiary amine compounds, of the structure

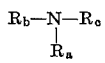

with hydrogen peroxide and peroxyacids. These reactions are described by Lake and Hoh in The Journal of the American Oil Chemist's Society, vol. 40, p. 268.

SUMMARY OF THE INVENTION

In summary, this invention is directed to a process for preparing a compound selected from a first group consisting of compounds having the formulas;

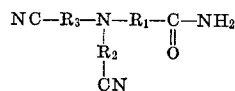

and

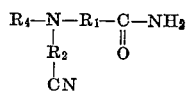

wherein each of $R_1$, $R_2$, and $R_3$ is separately an alkylene radical having about 1–20 carbon atoms and $R_4$ is an alkyl group (alkyl radical) having 1–20 carbon atoms; said process comprising reacting a member selected from a second group consisting of compounds having the formulas

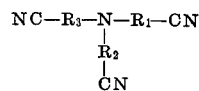

and

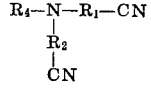

with an aqueous hydrogen peroxide solution at about 15–95° C. separating, and recovering the resulting product.

DESCRIPTION OF PREFERRED EMBODIMENTS

In preferred embodiments of the process set forth in the above summary:

(1) Each of $R_1$, $R_2$, and $R_3$ is —$CH_2$—;
(2) Each of $R_1$, and $R_2$ is —$CH_2$— and $R_4$ is selected from the group consisting of

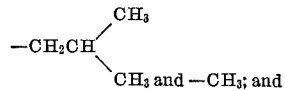

(3) A first aqueous solution consisting essentially of about 5–7°% hydrogen peroxide is added to a first aqueous system consisting essentially of water and a member of the aforesaid second group, the concentration of the second group member in the first aqueous system being about 0.1–10 moles per liter of the first aqueous system; the hydrogen peroxide being added at a rate of about 0.2–2.6 moles of hydrogen peroxide, as $H_2O_2$, per mole of the second group number.

In an especially preferred embodiment of the embodiment set forth in item 3, supra, the temperature of the mixture resulting from the addition of the hydrogen peroxide solution to the first aqueous system is maintained at about 60–70° C. for about 0.1–10 hours before separating the nitrilomonoacetamide product therefrom.

In another preferred embodiment ("Embodiment A") this invention is directed to a process for preparing nitrilodiacetonitrile monoamide

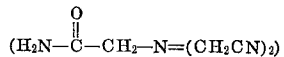

said process comprising:
(a) Preparing a first aqueous system, said system consisting essentially of about 0.5–5 moles of nitrilotriacetonitrile per liter of said system;

(b) Forming a reacted mixture consisting essentially of water, unreacted nitrilotriacetonitrile, and nitrilodiacetonitrile monoacetamide by adding a first aqueous solution consisting essentially of about 5–70% hydrogen peroxide in water to said first aqueous system while maintaining the temperature of the resulting mixture above about 25° C. and below about 95° C.; the first aqueous solution being added in an amount to supply about 0.5–2.5 moles of hydrogen peroxide per mole of nitrilotriacetonitrile;

(c) Cooling the reacted mixture to about 10–25° C. to precipitate a first solid phase, the solid phase consisting essentially of unreacted nitrilotriacetonitrile;

(d) Separating the first solid phase from the reacted mixture to obtain the aforesaid first solid phase and a second aqueous solution consisting essentially of water and nitrilodiacetonitrile monoacetamide;

(e) Forming a second concentrated aqueous system consisting essentially of water and nitrilodiacetonitrile monoacetamide by evaporating water from the second aqueous solution to reduce the water content thereof to about 10–50%;

(f) Forming an aqueous phase and an acetone phase by extracting the second concentrated aqueous system with acetone using about 20–200 milliliters of acetone per 100 milliliters of the second aqueous system while maintaining the temperature of the concentrated aqueous system and the acetone at about 25–55° C.;

(g) Separating said acetone phase from the aqueous phase;

(h) Cooling the separated acetone phase to about 0–24° C. to precipitate crystalline nitrilodiacetonitrile monoacetamide; and (i) Recovering the precipitated crystalline nitrilodiacetonitrile monoacetamide.

In another preferred embodiment ("Embodiment B") this invention is directed to a process for forming an alkyl nitriloalkylenenitrile monoacetamide compound having the formula

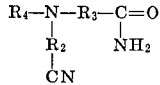

wherein each of $R_2$, and $R_3$ is separately an alkylene radical having about 1–20 carbon atoms and $R_4$ is an alkyl group having about 1–20 carbon atoms, said process comprising reacting an alkyl nitrilodialkylenenitrile compound of the formula

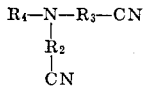

with an aqueous hydrogen peroxide solution at about 25–95° C., separating and recovering the alkyl nitriloalkylenenitrile monoacetamide product.

In preferred embodiments of Embodiment B, supra:

(1) $R_4$ is an alkyl group having about 2–12 carbon atoms;

(2) A first aqueous solution consisting essentially of about 5 to 70% hydrogen peroxide is added to a second aqueous system consisting essentially of about 0.1 to 10 moles of the alkyl nitrilodialkylenenitrile per liter of second aqueous system, the hydrogen peroxide solution being added at a rate to supply about 0.5–2.5 moles of $H_2O_2$ per mole of the alkyl nitriledialkylene nitrile; and (3) The alkyl nitrilodialkylenenitrile compound and the aqueous peroxide solution are reacted at about 60–70° C.

In another preferred embodiment ("Embodiment C") this invention is directed to a compound selected from the group consisting of

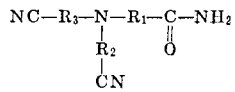

and

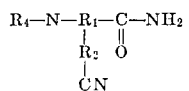

wherein each of $R_1$, $R_2$, and $R_3$ is separately an alkylene group having about 1–20 carbon atoms and $R_4$ is an alkyl group having about 1–20 carbon atoms.

In preferred embodiments of Embodiments C, supra:

(1) $R_1$, $R_2$, and $R_3$ are each —$CH_2$—; and (2) $R_1$ and $R_2$ are each —$CH_2$— and $R_4$ is a member selected from the group consisting of

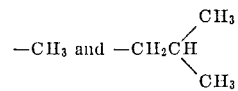

In another preferred embodiment ("Embodiment D") this invention is directed to a process for preparing a product having the formula

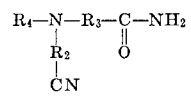

wherein each of $R_2$ and $R_3$ is separately an alkylene (divalent alkyl) radical having about 1–20 carbon atoms, and $R_4$ is an alkyl radical having about 1–20 carbon atoms, said process comprising.

(a) Preparing a first aqueous system, said system consisting essentially of about 0.5–5 moles of a first compound having the formula

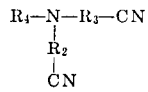

per liter of said solution;

(b) Forming a reacted mixture consisting essentially of water unreacted first compounds and product by adding a first aqueous solution consisting essentially of about 5–70% hydrogen peroxide in water to said first aqueous system while maintaining the temperature of the resulting mixture above about 25° C. and below about 95° C. for about 0.1–10 hours; the first aqueous solution being added in an amount to supply about 0.5–2.5 moles of hydrogen peroxide per mole of the first compound;

(c) Cooling the reacted mixture to about 10–25° C. to precipitate a first solid phase;

(d) Separating the first solid phase from the reacted mixture to obtain a second aqueous solution consisting essentially of water and product;

(e) Forming a substantially water free system by evaporating water from the second aqueous solution (preferably under vacuum, e.g., about 1–50 mm. of mercury absolute pressure and at a temperature of about 20–70° C.) until it is substantially water free, the substantially water free system consisting essentially of a product syrup and a second solid phase;

(f) Separating the syrup from the solid phase (e.g., by filtration, decantation, or centrifugation) to obtain a separated product syrup substantially free of the solid phase;

(g) Recovering the separated product syrup (if desired the separated product (i.e., the separated syrup) can be purified by washing with a solvent in which it (the product) is substantially insoluble, such solvents including acetone, methyl ethyl ketone, diethyl ketone, and the like before being recovered. Where washing the product it is generally preferred to use about 10–100 ml. of solvent per 100 g. of product.)

DETAILED DESCRIPTION OF THE INVENTION

I have made the surprising discovery that when a tertiary amine compound having the formula

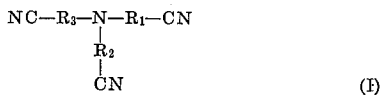

or

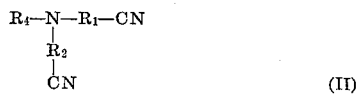

wherein each of $R_1$, $R_2$, and $R_3$ is separately an alkylene radical (divalent alkyl group) having about 1–20 carbon atoms and $R_4$ is an alkyl group (radical) having about 1–20 carbon atoms, is treated with an aqueous hydrogen peroxide solution the principal product is a monoacetamide having the formula

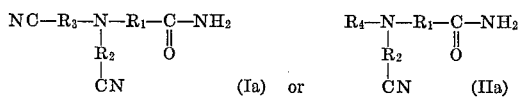

product (Ia) being obtained from an amine compound of Formula I and product (IIa) being obtained from an amine compound of Formula II.

In the past, nitrilotriacetamide

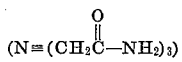

has been prepared by the acid hydrolysis of nitrilotriacetonitrile, but thus far the isolation of nitrilodiacetontrile monoacetamide has not been reported by said acid hydrolysis process or by any other process.

As used herein, the term nitrilotrialkylenenitrile is to be construed as meaning a compound having the formula

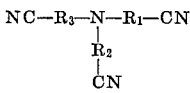

wherein each of $R_1$, $R_2$, and $R_3$ is separately a divalent alkyl radical (i.e., an alkylene radical) having about 1–20 carbon atoms.

As used herein, the term nitrilodialkylenenitrile monoacetamide is to be construed as meaning a compound having the formula

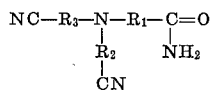

where $R_1$, $R_2$, and $R_3$ are divalent alkyl radical (i.e., alkylene radicals, or alkylene groups) having about 1–20 carbon atoms.

As used herein the term alkyl nitrilodialkylenenitrile means a compound having the formula

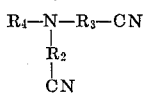

wherein each of $R_2$ and $R_3$ is separately an alkylene group having about 1–20 carbon atoms and $R_4$ is an alkyl group having about 1–20 carbon atoms.

As used herein the term alkyl nitriloalkylenenitrile monoacetamide means a compound having the formula

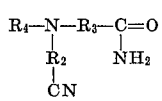

wherein each of $R_2$ and $R_3$ is separately an alkylene radical having about 1–20 carbon atoms and $R_4$ is an alkyl group having about 1–20 carbon atoms.

In this invention, a compound selected from the generic class of nitrilotrialkylenenitriles and alkyl nitrilodialkylenenitriles, as defined supra, is dissolved or suspended in water. Aqueous hydrogen peroxide is then added to the aforementioned solution or suspension at a rate and under conditions such that the temperature of the reaction does not exceed about 96° C. External cooling (e.g., cooling coils, cooling jackets, air jets, or the like) can be used if desired. Alternatively, external heating (e.g., heating coils, heating jackets, hot air jets, electric heating elements, or the like) can be used if desired. The temperature is then preferably kept within a temperature range of from above about 25° or 30° C. to below about 95° C. (preferably about 50–75° C., more preferably about 60–70° C.) for about 0.1–10 hours. The mole ratio of hydrogen peroxide to the nitrilotrialkylenenitrile or alkyl nitrilodialkylenenitrile or alkyl nitrilodialkylenenitrile. After the hydrogen peroxide addition has been completed, the resulting liquid reaction mixture is stirred for about 0.1–10 hours and then (after the stirring period) cooled to room temperature or lower. After cooling and upon standing for a few minutes it is usually noted that crystals have precipitated from the liquid reaction mixture. These are separated from the liquid reaction mixture which is then labeled "Liquid A," by filtration, centrifugation, or like method, and have been found to be unreacted starting material (the starting nitrile).

The product (i.e., the nitriledialkylenenitrile monoacetamide or the alkyl nitriloalkylenenitrile monacetamide) can then be separated and recovered as a rather crude (somewhat impure) product by evaporating Liquid A substantially to dryness. Alternatively the product can be purified before being recovered.

Where the starting material is

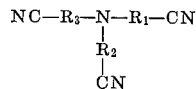

the monoacetamide product can be purified before recovery and then recovered by the following general procedure:

Liquid A (defined supra) is concentrated by evaporating water therefrom (suitably using reduced pressure and a temperature of about 25–70° C.) until the water content thereof is reduced to about 10–50% to form a system called "System A." Said System A is then extracted with a solvent such as acetone, methyl ethyl ketone, diethyl ketone, or the like to dissolve the monoacetamide product in the solvent, thereby to form a solution ("Solution A") of product in the solvent, preferably using about 20–200 ml. of the solvent per 100 ml. of System A while maintaining the temperature of System A and the solvent at about 25–55° C. The resulting solution of product in solvent (Solution A) is separated from aqueous phase.

Purified product is then crystallized from the Solution A by cooling said solution to about 0–24° C. The crystallized purified product,

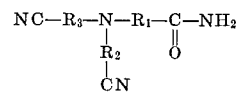

can be separated from the solvent by centrifugation, decantation or filtration and recovered or it can be further purified by recrystallizing from a solvent such as acetone, diethyl ketone, methyl ethyl ketone, or the like and then recovered. If desired the separated product can be dried, freed of traces of solvent by warming (e.g., to about 35–70° C.) preferably under vacuum before being recovered.

Where the starting product is

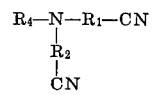

the monoacetamide product can be purified by the following general procedure:

Liquid A (defined supra) is cooled to about 10–25° C. to precipitate a solid material (unreacted starting material, i.e., the starting nitrile) which is separated (by centrifugation, filtration, or decantation) to give a solution (Solution B) consisting essentially of water and product plus, at least in some instance, small amounts of a diacetamide side-product,

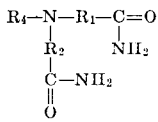

Solution B is then evaporated (preferably under reduced pressure and at about 20–70° C.) until it produces a syrup and a small amount of solid material. The syrup is separated from the solid material (by filtration centrifugation, or decantation.) The syrup which consists essentially of crude (somewhat impure) monoacetamide product can be recovered or it can be purified by extraction with a solvent (e.g., acetone, methyl ethyl ketone, or the like) in which said product is substantially insoluble and in which impurities in the syrup are substantially soluble. The syrup is separated from the solvent (e.g., by decantation or centrifugation). The thus purified syrup product,

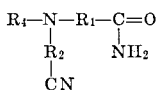

can be recovered or it can be further purified by a second extraction. If desired the separated product can be dried (freed of solvent) by heating (e.g., at about 35–70° C.) preferably under vacuum.

Typical of the nitrilotrialkylenenitrile compounds which have given excellent results in the process of this invention are nitrilotriacetonitrile, nitrilodiacetonitrile propionitrile, nitrilotripropionitrile, nitrilodipropionitrile acetonitrile, and nitrilotributyronitrile.

Typical of the alkyl nitrilodialkylenenitrile compounds which have given excellent results in the process of this invention are N-isobutyliminodiacetonitrile, N-normal-butyliminodiacetonitrile, N-isopropyliminodiacetonitrile, N-normalpropyliminodiacetonitrile, N-ethyliminodiacetonitrile, the N-pentyliminodiacetonitriles, the N-hexyliminodiacetonitriles, N-cyclohexyliminodiacetonitrile, and

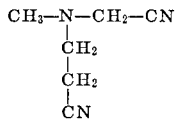

Extraction solvents which can be employed in purifying crude products in the process of this invention include acetone, methyl ethyl ketone, isopropyl alcohol, ethyl butyrate, and the like.

The following examples are provided to further illustrate and point out the novel and useful aspects of this invention, but are in no way intended to limit the invention.

Example I

A suspension of 67 grams of nitrilotriacetonitrile in 300 ml. of water was heated to 60° C. To this heated suspension was added 126 ml. of a 30.7 weight percent hydrogen peroxide solution. Said peroxide solution was added dropwise over a one hour period and the reaction vessel was externally cooled by immersing the flask periodically in an ice-water bath so as to prevent the temperature from exceeding 65° C. After the addition of hydrogen peroxide was completed, the resulting reaction mixture was stirred for an additional 2 hours while maintaining the temperature at 65–75° C. Said reaction mixture was then cooled to room temperature, whereupon crystals precipitated from the reaction mixture. These crystals were isolated (M.P. 120–130° C.) and were shown to be unreacted nitrilotriacetonitrile.

The remaining solution or filtration from which the aforementioned crystals were isolated, was evaporated until a super-saturated mixture having a syrup-like consistency was obtained, and said mixture was extracted with hot acetone at a temperature of about 50–55° C. The acetone phase was then separated from the aqueous phase and the acetone phase was treated with activated charcoal and filtered. The filtrate, upon cooling to about 10° C., yielded crystals which were recrystallized from acetone to give 5.2 grams of white needles, M.P. 158–159° C. These crystals were identified as nitrilodiacetonitrile monoacetamide (see Example IV).

Example II

The procedure of Example I is followed, substituting nitrilotripropionitrile for nitrilotriacetonitrile. 88 grams of nitrilotripropionitrile are used and 8.0 grams of nitrilodipropionitrile monopropionamide are isolated as the product.

Example III

A suspension of 67 grams of nitrilotriacetonitrile in 300 ml. of water was heated to about 60–65° C. To this heated suspension was added about 63 ml. of a 30.7 weight percent solution of hydrogen peroxide (aqueous). Said peroxide solution was added dropwise over a ½ hour period. The temperature of the reaction mixture rose to about 95° C. and the reaction mixture turned a dark brown. After the hydrogen peroxide addition was complete, the resulting mixture was stirred for 2 hours, during which time it cooled to room temperature (ca. 20° C.) and cubic crystals precipitated from the solution. These crystals were filtered from the liquid, washed with cold water, treated in boiling water with charcoal, and the resulting boiling mixture was filtered. Upon cooling, the filtrate yielded cubic crystals. The residue crystals were recrystallized from water and melted at 125–127° C. The filtrate was concentrated and further cooled, yielding needle-shaped crystals which melted at 146–148° C. After recrystallization from water, 4.6 grams of crystals melting at 158–159° C. were obtained. These crystals were identified as nitrilodiacetonitrile monoacetamide (Example IV).

Example IV

The structures of the product crystals of Examples I and III were proven by elemental analysis, nuclear magnetic resonance and infrared spectroscopy.

Example V

A first mixture of 0.2 mole of N-isobutyliminodiacetonitrile in 125 ml. of water was heated to about 60–65° C. and 32 ml. of a 30.7% solution of hydrogen peroxide was added thereto. The hydrogen peroxide solution was delivered dropwise to the aforesaid first mixture over a period of about an hour while stirring the resulting peroxide containing second mixture and while maintaining the temperature thereof at about 60–65° C.

After adding all of the peroxide, the temperature of the resulting mixture (the second mixture) was adjusted to about 75° C. at which temperature said second mixture was maintained, while stirring said second mixture, for about 8 hours to form a third mixture, said third mixture containing N-isobutyliminoacetonitrile monoacetamide

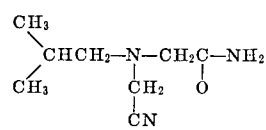

The third solution was cooled to about 20° C., filtered to remove some solid particles (unreacted N-isobutyliminodiacetonitrile) which were present and to yield a first filtrate. The first filtrate was evaporated under vacuum (ca. 20 mm. of mercury absolute pressure and ca. 30–70° C.) to a volume of about 40 ml. to form a syrup substantially free of water. The thus concentrated first filtrate was filtered to remove a small amount of solid material (identified as a diamide, N-isobutylnitrilodiacetamide).

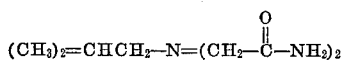

which formed and to yield a second filtrate.

The second filtrate, a syrup substantially free of water was characterized as the desired product (N-isobutyliminomonoacetonitrile monoacetamide).

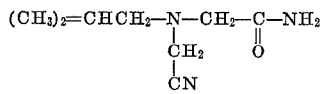

by its infrared spectrum. This material was not soluble in hot (up to ca. 40–55° C.) acetone. Hence the hot acetone extraction-crystallization procedure of Example I could not be used to purify the monoacetamide product obtained in this example (Example V). Accordingly syrup (crude product) obtained in this example was treated (extracted) with hot acetone using about 40–70 ml. of acetone per 100 ml. of syrup to extract impurities from the syrup. The acetone extracted syrup was separated from the acetone by decantation, dried (freed of traces of acetone) by heating at about 25–60° C. under vacuum and recovered.

Example VI

The general procedure of Example V was repeated. However, in this instance the N-isobutyliminodiacetonitrile was replaced by 0.2 mole of N-methyliminodiacetonitrile and the reaction time (the heating time after adding the hydrogen peroxide to the mixture of water and N-methyliminodiacetonitrile) was about 5 hours.

The final product was identified as N-methyliminomonoacetonitrile monoamide,

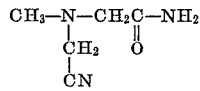

by its infrared spectrum and by its solubility characteristics—said final product being readily soluble in organic solvents such as ethanol, methanol, and acetone.

The nitrilodialkylenenitrile monoacylamides of this invention having the formula

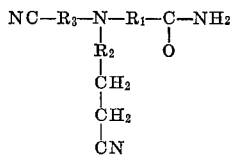

and including

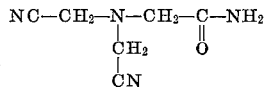

wherein $R_1$, $R_2$, $R_3$, and $R_4$ as defined supra, are extremely useful compounds. It has long been known to those skilled in the polymer art that dinitrile compounds can be copolymerized with diamine compounds to yield polyamides. The products of the instant invention, having two nitrile groups, can likewise be polymerized with diamines to yield polyamides having acylamide side groups. Such polymers have many uses including use as flocculating agents in water purification and sewage treatment and as intermediates for making polyamides with organic acid side groups.

The alkyl nitriloalkylenenitrile monoacetamides of this invention having the formula

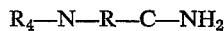

and including

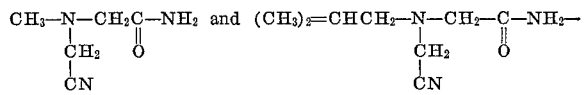

wherein $R_1$, $R_2$, $R_3$, and $R_4$ are as defined supra, have been used as antistatic compounds in polymer compositions including such compositions comprising polyvinyl chloride, polyethylene, and other polyolefins—and also as textiles finishes.

As used herein the term "percent (%)" means parts per hundred by weight unless otherwise defined where used, and the term "part," unless otherwise defined where used, means parts by weight. The term "g." means gram or grams and the term "ml." means milliliter.

I claim:

1. A process for preparing a nitrilomonoacetamide product compound selected from a first group consisting of compounds having the formulas;

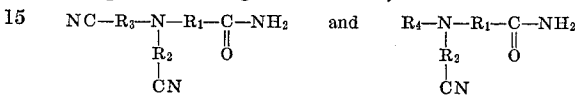

wherein $R_1$, $R_2$ and $R_3$ are lower alkylene radicals and $R_4$ is an alkyl radical having 1–20 carbon atoms; said process comprising reacting a member selected from a second group consisting of compounds having the formulas;

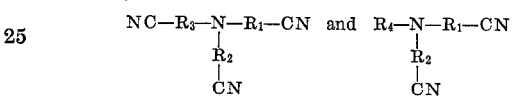

with an aqueous hydrogen peroxide solution containing from about 5–70 percent hydrogen peroxide at about 15–95° C., separating, and recovering the resulting product.

2. The process of claim 1 wherein each of $R_1$, $R_2$ and $R_3$ is —$CH_2$—.

3. The process of claim 1 wherein each of $R_1$ and $R_2$ is —$CH_2$— and $R_4$ is selected from the group consisting of

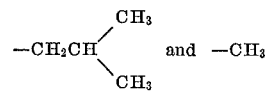

4. The process of claim 1 wherein said hydrogen peroxide solution is added to a first aqueous system consisting essentially of water and a member of the aforesaid second group, the concentration of the second group member in the first aqueous system being about 0.1–10 moles per liter of the first aqueous system, said hydrogen peroxide solution being added at a rate of about 0.2–2.6 moles of hydrogen peroxide, as $H_2O_2$, per mole of the second group member.

5. The process of claim 4 wherein the temperature of the mixture resulting from the addition of said hydrogen peroxide solution to the first aqueous system is maintained at about 60–70° C. for about 0.1–10 hours before separating the nitrolomonoacetamide product therefrom.

6. A process for preparing nitrilodiacetonitrile monoacetamide, said process comprising:

(a) preparing a first aqueous system, said system consisting essentially of about 0.5–5 moles of nitrilotriacetonitrile per liter of said system;

(b) forming a reacted mixture consisting essentially of water, unreacted nitrilotriacetonitrile, and nitrilodiacetonitrile monoacetamide by adding a first aqueous solution consisting essentially of about 5–70% hydrogen peroxide in water to said first aqueous system while maintaining the temperature of the resulting mixture above about 30° C. and below about 95° C. for about 0.1–10 hours, the first aqueous solution being added in an amount to supply about 0.5–2.5 moles of hydrogen peroxide per mole of nitrilotriacetonitrile;

(c) cooling the reacted mixture to about 10–25° C. to precipitate a first solid phase consisting essentially of unreacted nitrilotriacetonitrile;

(d) separating the first solid phase from the reacted mixture to obtain the aforesaid first solid phase and a second aqueous solution consisting essentially of water and nitrilodiacetonitrile monoacetamide;

(e) forming a second concentrated aqueous system consisting essentially of water and nitrilodiacetonitrile monoacetamide by evaporating water from the second aqueous solution to reduce the water content thereof to about 10-50%;

(f) forming an aqueous phase and an acetone phase by extracting the second concentrated aqueous system with acetone using about 20-200 milliliters of acetone per 100 milliliters of the second aqueous system while maintaining the temperature of the concentrated aqueous system and the acetone at about 25-55° C.;

(g) separating the acetone phase from the aqueous phase;

(h) cooling the separated acetone phase to about 0-24° C. to precpitate crystalline nitrilodiacetonitrile monoacetamide; and (i) separating and recovering the precipitated crystalline nitrilodiacetonitrile monoacetamide.

7. A process for forming an alkyl nitriloalkylenenitrile monoacylamide compound having the formula

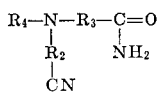

wherein each of $R_2$ and $R_3$ are lower alkylene radicals and $R_4$ is an alkyl radical having about 1-20 carbon atoms, said process comprising reacting an alkyl nitrilodialkylenenitrile compound of the formula

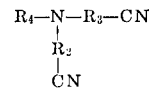

with an aqueous hydrogen peroxide solution containing from about 5-70 percent hydrogen peroxide at about 25-95° C., separating and recovering the alkyl nitriloalkylenenitrile monoacetamide product.

8. The process of claim 7 wherein said $R_4$ is a lower alkyl radical.

9. The process of claim 7 wherein said aqueous hydrogen peroxide solution is added to a second aqueous system consisting essentially of about 0.1 to 10 moles of the alkyl nitrilodialkylenenitrile per liter of second aqueous system at the rate of 0.2 to 2.6 moles of hydrogen peroxide per mole of alkyl nitrilodialkylene nitrile.

10. The process of claim 7 wherein the alkyl nitrilodialkylenenitrile compound and the aqueous peroxide solution are reacted at about 60-70° C.

OTHER REFERENCES

Terent'ev et al.: C.A., vol. 47, p. 12238 (1953).
Terent'ev et al.: C.A., vol. 52, p. 8046 (1958).
Buckus et al.: C.A., vol. 58, p. 5779 (1963).

JOSEPH P. BRUST, Primary Examiner

U.S. Cl. X.R.

260—2, 78, 92.8, 94.9, 464, 465.5, 561